Patented May 19, 1942

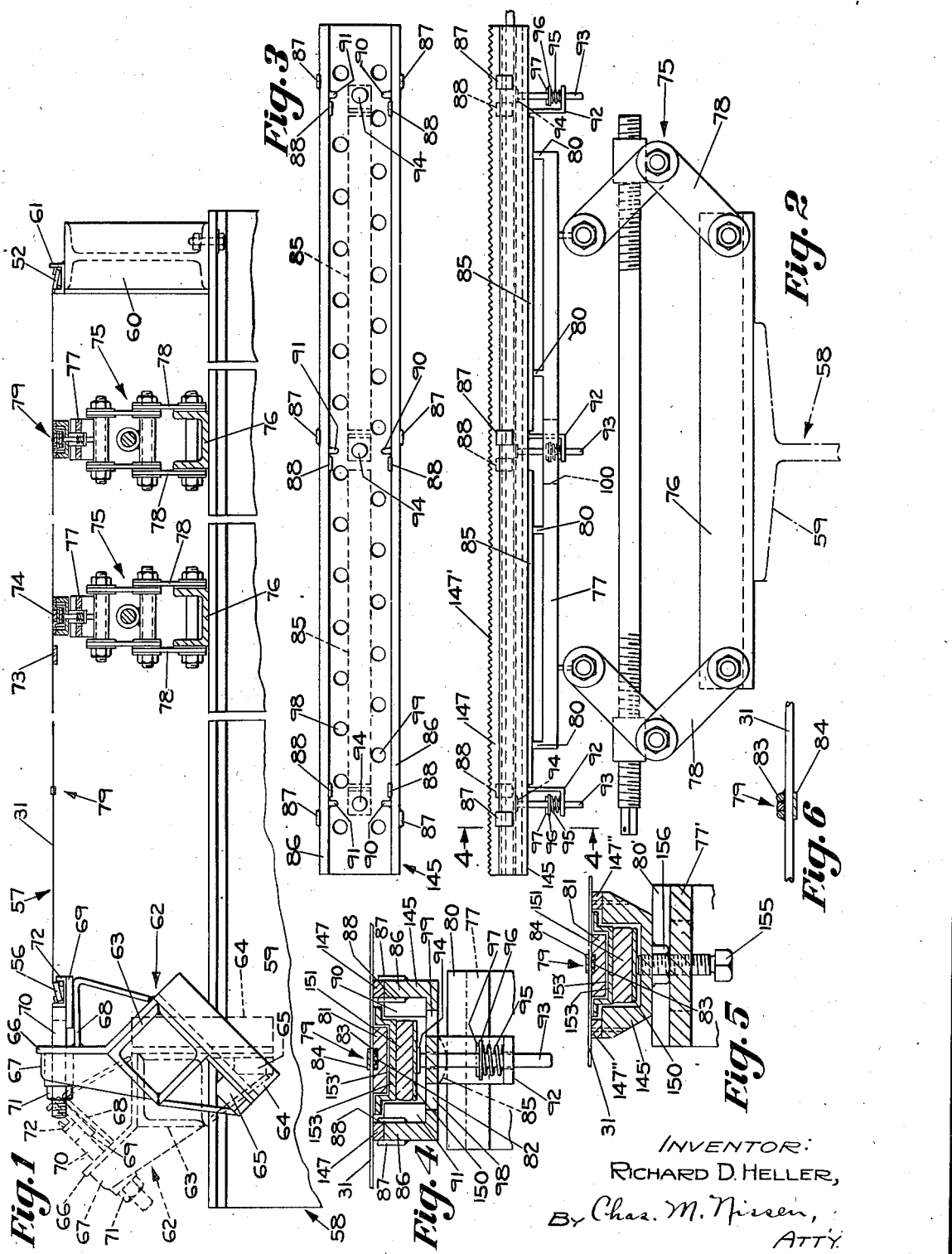

2,283,882

UNITED STATES PATENT OFFICE 2,283,882

APPARATUS FOR MAKING SCREEN CLOTH

Richard D. Heller, Columbus, Ohio

Application November 25, 1941, Serial No. 420,389

21 Claims. (Cl. 140—3)

This invention relates to a new and improved apparatus for making screen cloth, particularly of the type comprising a plurality of parallel strands of wire as distinguished from wire woven type of screen cloth.

One of the objects of the present invention is the provision of improved apparatus for connecting cross-strips to the parallel strands of wire of a non-woven wire screen cloth.

A further object of the invention is the provision of improved and efficient lifting and adjusting mechanism for soldering apparatus applied to connecting bars or transverse strips to secure the same to parallel wires of the screen cloth panel while such wires are held taut by means of tensioning mechanism.

Another object of the invention is the provision of equalizing mechanism for the supporting means of soldering apparatus applied to connecting bars or transverse strips to facilitate the securing of the latter to the parallel wires of a screen cloth panel.

A further object of the invention is the provision of heat radiating means for soldering apparatus supporting mechanism to reduce to a minimum the expansion of the latter during the soldering of connecting bars or transverse strips to the parallel wires of a screen cloth panel.

Other objects of the invention will appear hereinafter, the novel features and combinations being set forth in the appended claims.

In the accompanying drawing,

Fig. 1 is an elevational view, partly in section, of the mechanism for supporting the end bars of a screen cloth while applying tension thereto;

Fig. 2 is an elevational view of one of the parallel motion jacks of Fig. 1;

Fig. 3 is a plan view of the carrier for the soldering apparatus, with the serrated bars of Fig. 2 omitted;

Fig. 4 is an enlarged sectional view taken on the line 4—4 of Fig. 2, looking in the direction of the arrows;

Fig. 5 is a sectional view similar to that shown in Fig. 4, but disclosing the form shown in my co-pending application, Ser. No. 346,342, filed July 19, 1940, for a Method of making screen cloth; and Fig. 6 shows the construction of one of the intermediate strips produced either by the form of soldering apparatus shown in Fig. 4 or the form of soldering apparatus shown in Fig. 5.

The apparatus shown in the accompanying drawing is particularly adapted to operate upon an elongated panel 57 composed of parallel spaced-apart piano wires or the like, secured at their ends as by soldering to connecting end bars 52 and 56. My improved apparatus shown in the accompanying drawing has been produced to further treat such panel by securing thereto connecting strips 79 in parallel relation to the end bars 52 and 56 so that the completed screen cloth may be efficiently used in vibrating apparatus, with the end bars 52 and 56 and the connecting strips 79 extending longitudinally of the direction of the vibration. The apparatus shown in Fig. 1 is also adapted to subject the panel 57 to further treatment to make a plurality of sections of screen cloth each having end bars, such as 52, 74 and 56, 73, and each having one or more intermediate connecting strips 79. These operations which can be performed on the panel 57 will now be described.

Mechanism for treating the panel of screen cloth 57 is in the form of a table 58 comprising a main frame 59 which I have found can be conveniently made by merly taking a desired length of very heavy I-beam to the end of which is attached a bracket 60 having at its top a holding bracket 61 for removably receiving one of the end bars, such as the end bar 52. The bracket 61 may take the form of the bracket associated with the deck of the screen which attaches the screen cloth thereto, as disclosed and claimed in my co-pending application, Serial No. 234,014, filed October 8, 1938, for an improvement in Screens.

To provide for supporting and stretching the panel of screen cloth 57, I have shown in Fig. 1 means for attaching the other end bar 56 to an adjustable bracket 62 which is slidable along the top flanges of the main frame 59 so as to be positioned at the proper distance from the bracket 60 to receive the length of panel of the screen cloth 57, it being, of course, understood that the length of these panels will vary from time to time.

The bracket 62 comprises a box-like construction 63 which may be formed by welding together a pair of angular members from which extends downwardly a pair of spaced arms 64, 64 which extend below the top flanges of the main frame 59. Extending inwardly from each of the arms 64, 64 is a locking block 65. Extending upwardly from the box-like construction 63 is an arm 66 which has an appreciable width and is provided with spaced re-inforcing plates 67. Extending across the face of the arm 66 is a shelf 68 upon which is slidably mounted a plate 69 to which is attached a plurality of bolts 70, the latter extending through the arm 66 to receive the nuts

71. The plate 69 also carries an attaching bracket 72 similar to the attaching bracket 61, for removable attachment to the end bar 56 of the panel of screen cloth 57.

To adjust the bracket 62 to the desired position to receive the end bar 56, it is moved to the dotted line position shown in Fig. 1 of the drawing where one side of the box 63 has a large bearing area of contact with the top flanges of main frame 59, under which conditions the locking block 65 is spaced from the lower surfaces of the top flanges of main frame 59, whereupon the bracket 62 may slide freely along said main frame 59. When the bracket 62 has reached the position desired, it is rotated clockwise from the dotted line position illustrated in Fig. 1 of the drawing, to the full line position, in which position there is a relatively sharp edge of the box-like construction 63 in contact with the top of the main frame 59, and the two locking blocks 65 are in contact with the lower surfaces of said flanges in a position to the left of that position where said edge of the box 63 contacts with the top of the main frame 59. Under these conditions it is, of course, evident that any force which tends to rotate the bracket 62 in a clockwise direction will effect a clamping action between said sharp edge of box 63 and the top surface of main frame 59 and between the clamping block 65 and the bottoms of said flanges, thus securely clamping the bracket 62 in place. Such action is, of course, afforded by the tensioning of the panel of screen cloth 57 which is effected by virtue of the connection of the end bar 56 to the attaching bracket 72, the ultimate tension being applied by adjusting the nuts 71, the end bar 56 being attached to bracket 72. The nuts 71 are adjusted to tension the panel of screen cloth 57 evenly over the entire area.

With the panel of screen cloth 57 thus tensioned on the table 58, the next operations are those of attaching the desired number of end bars and intermediate strips. In the illustration given, the panel 57 was to be made into two sections of screen cloth, and consequently it is necessary to attach two additional end bars. Such end bars are illustrated at 73 and 74 in Fig. 1 of the drawing, and their manner of attachment will now be described.

I provide one or more parallel motion jacks 75, each of which has a bottom plate 76 and a top plate 77. Each top plate can be adjusted in height with respect to the bottom plate 76 by screw-operated parallel link mechanism 78 while maintaining the top plate 77 parallel to the bottom plate 76 at all times. The bottom plates 76 of the jack 75 merely rest on the top surfaces of main frame 59 so that either jack 75 may be placed in any position along the I-beam. A plurality of such jacks are preferably employed so that a plurality of operators may perform the advance functions which are to be performed on the screen cloth 57 simultaneously.

To attach the end bars 73 and 74 and cross-strip 79, as shown in Fig. 1, generally similar operations are performed. The operation of attaching the cross-strip 79 will now be described.

The jack 75 is placed at the desired position below that where the cross-strip 79 is to be permanently secured to the parallel wires of the screen cloth, and said jack is adjusted so that the plate 77 is at approximately the proper height. The plate 77 is provided with spaced-apart transverse webs 80, 80, the upper edges of which extend transversely of the plate 77 in parallelism to each other and all in the same horizontal plane. In fact, the upper edges of the webs 80, 80 are narrow and transversely elongated to receive the bars 85, 85 each of which is in the shape of a segment of a cylinder with its rounded surface on the under side and its upper flat surface permanently secured as by welding to the bottom central portion of the channel 145.

The upper edges 86, 86 of the vertical spaced-apart walls of the channel 145 are provided with adjacent pairs of clips 87, 88 between which are mounted the serrated guide strips one of which is shown at 147 in elevation in Fig. 2. These guide strips 147 rest loosely on the edges 86, 86 of the channel 145 between the clips 87, 88, and each of such guide strips 147 may be formed by cutting longitudinal strips from a threaded pipe, thereby providing the serrations 147' for receiving the wires of the panel 57.

Secured to the inner walls of the upright flanges of the channel 145 are inwardly projecting vertical spacers 90, 91. Between these spacers is mounted an elongated heating element 151 which is preferably coextensive with the length of the channel 145. On the bottom of the heating element 151 is an elongated metal plate 150 of the same length and width as the heating element. Resting on top of the heating element is a metal tray 153 of the same length as the heating element 151 and having a bottom of the same width as that of the heating element 151. The metal tray 153 is lined at 153' with solder-resistant material, such as asbestos. Within the tray 153 above the interlining 153' is a metal hot plate 81 having an elongated trough 82 adapted to receive a plurality of wires 83 closely adjacent to each other and in parallelism.

After the channel 145 and the parts associated therewith are in their proper places, the jack 75 is adjusted to force an intimate contact between the guide strips 147 and the wires 31 of the screen panel 57, whereupon the transverse webs 80, 80 will, by contact with the rounded bars 85, force the serrations 147' upwardly against the wires 31. By reason of the lower rounded surfaces of the bars 85, the channel 145 will be free to rock or tilt transversely of itself, thus equalizing the upward pressure of the serrations 147' against the under sides of the wires 31 of the screen panel 57.

As shown in Figs. 2, 3 and 4, I have provided distributed resilient mechanism for supporting the soldering elements on the channel 145 so as to secure equalization of the engagement between the soldering mechanism and the under sides of the wires 31 of the screen panel. L-shaped brackets 92 have their upper legs welded to the bottom of the channel 145 at spaced-apart points, as indicated in Fig. 2. The horizontal legs of these brackets are provided with openings for receiving the vertical rods 93, the upper ends of which are provided with flat circular heads 94 in position to engage at spaced-apart positions the lower surfaces of the metal base plate 150, as shown in Fig. 4. Springs 95 rest on the horizontal legs of the L-shaped brackets 92, and a washer 96 rests on the top of each spring. By means of cotter pins 97 extending diametrically through holes in the vertical rods 93, downward movement by pressure on the top head 94 of the pin 93 will be limited by the spring 95. Upward movement of the pin 93 will be limited by engagement of the cotter pin 97 with the bottom side of the channel 145. When this position is reached, the lower end of the pin 93 still remains in the hole in the horizontal leg of the L-shaped bracket 92 and therefore so long as the cotter pin remains in its position relative to the pin 93, neither the washer 96 nor the spring 95 will be released from their relative positions.

The adjustments of the relative positions of the spring 95, washer 96 and cotter pin 97 relative to the pin 93 and the horizontal leg of the bracket 92 are preferably such that when the soldering apparatus rests on the distributed circular heads 94, the hot plate 81 will have its upper surface above a plane extending through the serrations 147'. Consequently, when the guiding strips 147 are brought into engagement with the under sides of the wires 31 by operation of the lifting jack 75, the hot plate 81 together with the wires 83 in the trough 82 will be pressed against the under sides of the wires 31, and this action will result in compression of the springs 95. These springs may be relatively strong because the wires 31 of the screen panel 57 may have considerable tension exerted thereon before the soldering apparatus is brought into operation. That is to say, since the wires 31 have considerable tension thereon during soldering operations, the lifting jack 75 may be operated with sufficient force to firmly press the channel bar 145 against the under sides of the wires 31. Therefore, since the springs 95 are strong, they will have sufficient force, when compressed, to very firmly hold the hot plate 81 and the strip wires 83 in firm contact with the wires 31. Inasmuch as the springs 95 are distributed along the channel 145, as shown in Fig. 2, the strip wires 83 together with the hot plate 81 will be held firmly against the wires 31 throughout the lengths of the hot plate 81.

The heating element 151 is preferably of the electrical type and when the electric current is turned on, sufficient heat will be transmitted through metal tray 153, the asbestos lining 153' and the hot plate 81 to the trough 82 to raise the temperature of the wires 83 so that when solder is applied, they will be soldered together and also to the under sides of the wires 31. A metal plate cross-strip 84 may also be soldered at the same time to the upper sides of the wires 31, as shown in Fig. 4. It should be understood, however, that the panel 57 is upside down, as shown in Fig. 1, and therefore the wires 31 in Fig. 4 are also upside down, but in Fig. 6 the cross-strip is right-side up because when mounted on the deck of the vibrating apparatus, the wires 83 are on top and the metal plate strip 84 underneath, since the cross-strip of parallel wires 83 is stronger than the metal cross-strip 84.

Inasmuch as it is desirable to maintain the wires 31 of the screen equally spaced-apart and at predetermined distances from each other during the soldering operation, I have not only spaced the inner walls of the vertical flanges of the channel 145 from the edges of the elongated soldering mechanism by means of the spacers 90, 91, but I have also provided a multiplicity of bottom openings 98, 99 under the lateral edges of the heating element 151. The lateral flanges of the tray 153 extend toward the guide strips 147 but remain spaced therefrom. This arrangement provides for upward currents of air toward the inner edges of the guide strips 147, keeping the latter sufficiently cool to prevent undue expansion thereof, and therefore permitting the predetermined spacings between the wires 31 to be retained sufficiently during soldering operations to assure the desired spacing between the wires 31 after the soldering of the cross-strips to the wires 31 has been completed.

The form shown in Fig. 5 is disclosed in my co-pending application, Serial No. 346,342, filed July 19, 1940, for an improvement in Method of and apparatus for making screen cloth. In this form the plate 77' and the web 80' correspond to the plate 77 and web 80 in Fig. 2, in that a parallel motion jack 75 is used for lifting the elongated channel 145' upwardly so that the serrated guide strips 147'' will be forced against the lower sides of the wires 31. The bottom plate 150, the heating element 151, the tray 153, the asbestos lining 153', and the hot plate 81 in Fig. 5 are similar to the corresponding parts thus designated in Fig. 4. In Fig. 5, however, a series of set screws 155 is threaded through nuts 156 which are welded to the bottom of the channel 145'. The upper ends of these set screws 155 engage the bottom plates 150 to force upwardly the heating element 151 and the parts mounted thereon to hold the wires 83 in proper position during soldering operations.

With the parts adjusted as illustrated in Fig. 4 or with the parts adjusted as illustrated in Fig. 5, the wires 83 may be forced into intimate contact with the wires 31, and the strip of solder which is laid on top of the wires 31 above the wires 83, is melted after a reasonable heating period by the heat from the electric heating element 151. While the solder is in the molten condition a strip 84 of tin plate (sheet iron coated with tin) is laid on top of the wires 31, whereupon the electric current to the heater 151 is cut off and the solder allowed to solidify with the tin plate strip 84 soldered to one side of the wires 31 and the transverse wires 83 soldered to the other side of the wires 31, thereby producing the cross-strip section 79 as illustrated in Fig. 6 of the drawing.

As stated above, illustration in Fig. 6 is reversed from that of Fig. 4 or Fig. 5 because Fig. 6 shows the operating position of the screen cloth with the wires 83 on top thereof, while Fig. 5 as well as Figs. 1 and 4 shows the position of the cross-strip while the screen cloth is being completed.

A screen cloth comprising the combination with a plurality of parallel strands of wire with end bars attached thereto and a cross-strip formed of a plurality of strands of wire soldered to the parallel strands intermediate the end bars, is described and claimed in my co-pending application, Serial No. 394,846, filed May 23, 1941, for an improvement in Screen cloth and method of making same. To attach an end bar, such as an end bar 73 or an end bar 74, the operation is exactly the same as that required to attach a cross-strip 79 except for the fact of course that instead of the bar 81 I provide the end bar to be attached.

After the desired number of cross-strips 79 and end bars, such as end bars 73 and 74, have been attached, the panel of screen cloth 57 has its tension slackened by retracting the nuts 71 whereupon the panel 57 is cut between each pair of end bars which, in the illustration, will be between the end bars 73 and 74. Thereafter, if the extended lengths of wire beyond the end bars are excessive, they may be clipped off, bent over said end bars and covered by strips of tin plate which extend beyond each edge of the associated end bar 73 or 74 and also bent over as shown in my Patent No. 2,220,106, granted November 5, 1940, for an improvement in Screen cloth and method of making same. In other words, the bent over ends of the wires may have soldered thereto strips of tin plate likewise bent over to cover the end portions of the wires 31 including the bent over ends.

As previously indicated, it is possible to make more than two sections or panels of screen cloth on the table 58, and a number of such sections or panels can readily be predetermined by the available length of the table and the length of each section or panel desired. The number of persons that may be employed on the panel of screen cloth will vary with many conditions, but it is evident that more than one person may be employed at the same time in attaching end bars or cross-strips.

It should also be noted that the number of tables 58 may be increased or decreased in accordance with the rate of supply of the panels 57. Under some conditions one table may be found to be ample, but if the panels 57 tend to pile up, a larger number of tables 58 may be provided, each supplied with the equipment shown in Fig. 1, to enable operations to be carried out on the panels 57 as fast as produced. This arrangement increases the flexibility of the operations and makes possible the maximum utilization of the equipment at all times which would not be possible if all the work of division into a plurality of panels and the addition of intermediate connecting strips were to be performed on the apparatus by means of which the panel 57 is produced.

In the form shown in Fig. 5, the channel 145' may be lifted off the webs 80' only after the set screws 155 are removed from the nuts 156 whereas in the form shown in Fig. 4 the channel 145 together with the parts mounted thereon may be removed from the webs 80 whenever desired, since the middle bracket 92 extends through an opening 100 in the plate 77 and the end brackets 92 are spaced beyond the ends of the plate 77, as shown in Fig. 2.

Furthermore, while the channel 145' may be provided on its bottom with rounded strips such as those designated 85 in Fig. 2, the channel 145 of Fig. 4 is preferred because of the heat radiating features embodied therein for association with the guide strips 147' to prevent the soldering mechanism from unduly heating and expanding such guide strips.

This application is a continuation in part of my co-pending application, Serial No. 346,342, filed July 19, 1940, for an improvement in method of making screen cloth.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In mechanism for securing a connecting strip to a wire screen, the combination with a channel, of a heating element carried thereby, a tray mounted on said heating element, a layer of asbestos at the bottom of said tray, a hot plate in said tray on top of said layer of asbestos, a parallel wire cross-strip on said hot plate, and lifting mechanism extending through the bottom of said channel into engagement of said heating element to lift the latter and press the cross-strip on said hot plate against the wires of the screen during the soldering operation.

2. Mechanism for attaching an intermediate connecting strip to a screen cloth comprising spaced parallel wires comprising the combination with supporting mechanism for the end bars connected to the spaced parallel wires of the screen cloth, of a support for an intermediate strip comprising a plurality of closely adjacent transverse wires, means for placing the spaced parallel wires of the screen cloth under tension, and means acting on said support to press said transverse wires against the said spaced parallel wires preparatory to securing said transverse wires to each other and to said spaced parallel wires.

3. In mechanism for soldering connecting strips to a wire screen, the combination with a support, of a channel bar mounted on said support to extend transversely of the screen intermediate the ends thereof, a heating element in the channel portion of the said channel bar, an additional channel above the said heating element, a hot plate in said last-named channel, a plurality of transverse wires on said hot plate and in contact with the wires of the screen, and means for effecting lifting of the heating element to force said transverse wires against the wires of the screen to facilitate soldering each transverse wire to the next adjacent transverse wire and all of said transverse wires to the wires of the screen.

4. In mechanism for attaching connecting means to screen cloth wires, the combination with a support, of a channel bar mounted thereon, a heater located in channel portion of the channel bar, a metal tray mounted on said heater, an asbestos lining for said tray, a hot plate in said tray, a plurality of transverse wires in a groove in said hot plate, and a rectangular strip of tin plate on top of the wires of the screen cloth and covering said transverse wires, said heating element being adapted to heat said hot plate to effect soldering of said transverse wires to each other and to said rectangular strip as well as to the wires of the screen.

5. In mechanism for soldering cross-strips to a wire screen intermediate the ends of the latter, the combination with a support, of a channel bar mounted on said support to extend transversely of the screen intermediate the ends thereof, a heating element in the channel portion of the channel bar, a metal channel above said heating element, a lining of solder resisting material in said tray, a hot plate in said tray, a plurality of transverse wires, each in contact with the next adjacent wire, means extending through said channel bar in position to act on the heating element to lift the latter to force the hot plate toward the wires of the screen and hold the said transverse wires against the wires of the screen, and a metal strip on top of the wires of the screen in position to cover said transverse wires, said heating element being adapted to heat said hot plate to enable soldering of said transverse wires to each other and to said screen wires as well as to said metal strip.

6. In mechanism for soldering connecting strips to wire screens, the combination with a wire support, of a channel bar mounted on said support to extend transversely of the wires of the screen, a heating element in the channel of the channel bar, a hot plate on said heating element and provided with a top groove, transverse wires in said groove below the wires of the screen, and means for lifting the heating element to effect pressing of said transverse wires against the wires of the screen during the soldering of said transverse wires to each other and to the wires of the screen.

7. In mechanism for securing connecting strips to a wire screen, the combination with mechanism for supporting the screen, of a carrier for supporting a plurality of closely adjacent wires on the underside of the screen, means acting on said carrier to press the said transverse wires against the underside of the screen, and means supported by said carrier to heat solder to secure said transverse wires to the screen.

8. Mechanism for attaching to a screen cloth an intermediate connecting strip composed of a plurality of adjacent parallel wires, comprising the combination with supporting mechanism for the end bars of the screen cloth, of means affording a trough for supporting such plurality of adjacent wires in parallelism to each other, means for placing the wires of the screen cloth under tension, and means acting on said trough means to press said adjacent wires against the wires of the screen cloth preparatory to securing said strip wires to the parallel screen wires.

9. In mechanism for attaching an intermediate strip of adjacent wires to the wires of a screen cloth, the combination with supporting mechanism, of means for holding the wires of the screen cloth on the supporting mechanism, means affording a trough in which to support the adjacent wires for the intermediate strip, and mechanism for actuating said support to press said adjacent wires against the wires of the screen cloth preparatory to securing said adjacent wires to each other and to the wires of the screen cloth.

10. In mechanism for soldering a cross-strip of adjacent parallel wires to a wire screen intermediate the ends of the latter, the combination with a support, of a parallel motion jack for adjusting the elevation of said support while keeping it level, a channel bar mounted on said jack to extend transversely of said screen intermediate the ends thereof, a heating element in the channel portion of said channel bar, a channel of solder resisting material above said heating element, a hot plate in said last-named channel, said hot plate being provided with a trough for receiving a plurality of parallel adjacent wires for a transverse cross-strip, and means extending from said support through said channel bar to said heating element to lift the latter to force the parallel wires in said trough against the wires of the screen cloth to facilitate soldering of said adjacent parallel wires to the wires of the screen cloth intermediate the ends of the latter.

11. In apparatus for securing a connecting strip to a wire screen intermediate the ends of the latter, the combination with a support, of a parallel motion jack for adjusting the elevation of said support while keeping it level, and means resiliently carried by said support for securing the connecting strip to the wire screen intermediate the ends of the latter.

12. In mechanism for securing a connecting strip to a wire screen, the combination with mechanism for supporting the screen, of a carrier for the connecting strip adapted to be supported on the underside of the screen, and means comprising a plurality of spaced-apart resilient devices adapted to act on said carrier to press the strip against the underside of the wires of the screen preparatory to securing such strip to said screen wires intermediate the ends of the screen.

13. In mechanism for securing a connecting strip to a wire screen, the combination with mechanism for supporting the screen, of a carrier for the connecting strip, and means for yieldingly moving said carrier against the underside of the screen intermediate the ends of the latter, said moving means comprising a plurality of spaced-apart springs for pressing the carrier and the connecting strip against the undersides of the wires preparatory to securing the strip thereto.

14. In mechanism for securing a connecting strip to a wire screen intermediate the ends thereof, the combination with mechanism for supporting the screen, of an elongated carrier unit for the connecting strip, an elongated support, a plurality of spaced-apart springs for resiliently supporting said carrier on said support, and mechanism comprising a parallel motion jack for moving said support toward the screen to transmit pressure through said springs to said carrier to in turn press said connecting strip against the wires of the screen preparatory to securing said connecting strip to said wires.

15. In apparatus for soldering a connecting strip to a wire screen, the combination with soldering mechanism, of an elongated channel for receiving said soldering mechanism, means for supporting said channel for movement into engagement with the wires of the screen, and a plurality of spaced-apart resilient devices between said channel and said soldering mechanism to yieldingly press the latter against the wires of said screen.

16. In apparatus for soldering a connecting strip to a wire screen, the combination with soldering mechanism, of a channel for receiving said soldering mechanism, serrated guide strips mounted loosely on the upper edges of said flanges of said channel, spaced clips extending upwardly from said flanges in position to engage the sides of said serrated strips to position the latter on said flanges, and means for moving said channel toward said screen to press said serrated strips against the wires thereof and for pressing said soldering mechanism against the wires of the screen.

17. In apparatus for attaching a connecting strip to a wire screen, the combination with a support, of a channel mounted on said support to have a transverse rocking movement relatively thereto, means for pressing said channel against said screen while said channel is free to rock to a limited extent to effect equalization of pressure of the flanges of said channel on the wires of the screen, and mechanism carried by said channel for adhesively attaching said connecting strip to the screen wires.

18. In apparatus for attaching a connecting strip to a wire screen, the combination with supporting plate, of a plurality of transverse spaced-apart webs on said plate with their upper edges in the same plane and each rectilinear, a channel, elongated strips on the bottom of said channel, each of said elongated strips having the shape of a segment of a cylinder and each resting on a plurality of said webs, soldering mechanism in said channel, and means for pressing said soldering mechanism against the wires of the screen.

19. In apparatus for soldering a connecting strip to a wire screen, the combination with a channel having a multiplicity of spaced openings in the bottom thereof, of soldering mechanism in said channel, spacers to hold the edges of the soldering mechanism spaced from the inner vertical walls of the flanges of the channel to permit free circulation of air through said openings past the edges of said soldering mechanism to the upper edges of the flanges of said channel to reduce the temperature of such edges, and means for effecting contact between said upper edges and the wires of the screen and contact between the soldering mechanism and such wires.

20. Apparatus for soldering connecting strips to the wires of a screen comprising the combination with an elongated channel, of L-shaped brackets secured to the bottom of said channel, a spring-pressed support on each bracket, and soldering mechanism in said channel and resting on said spring-pressed supports.

21. Apparatus for soldering connecting strips to wires of a screen comprising the combination of an elongated support, of a plurality of spring-pressed supports distributed along the bottom of said support, soldering mechanism adapted to rest on said spring-pressed supports, and means for positioning said first-named support to bring said soldering mechanism into engagement with the wires of said screen and cause said spring-pressed supports to yieldingly hold said soldering mechanism against such wires.

RICHARD D. HELLER.